Figure 1:
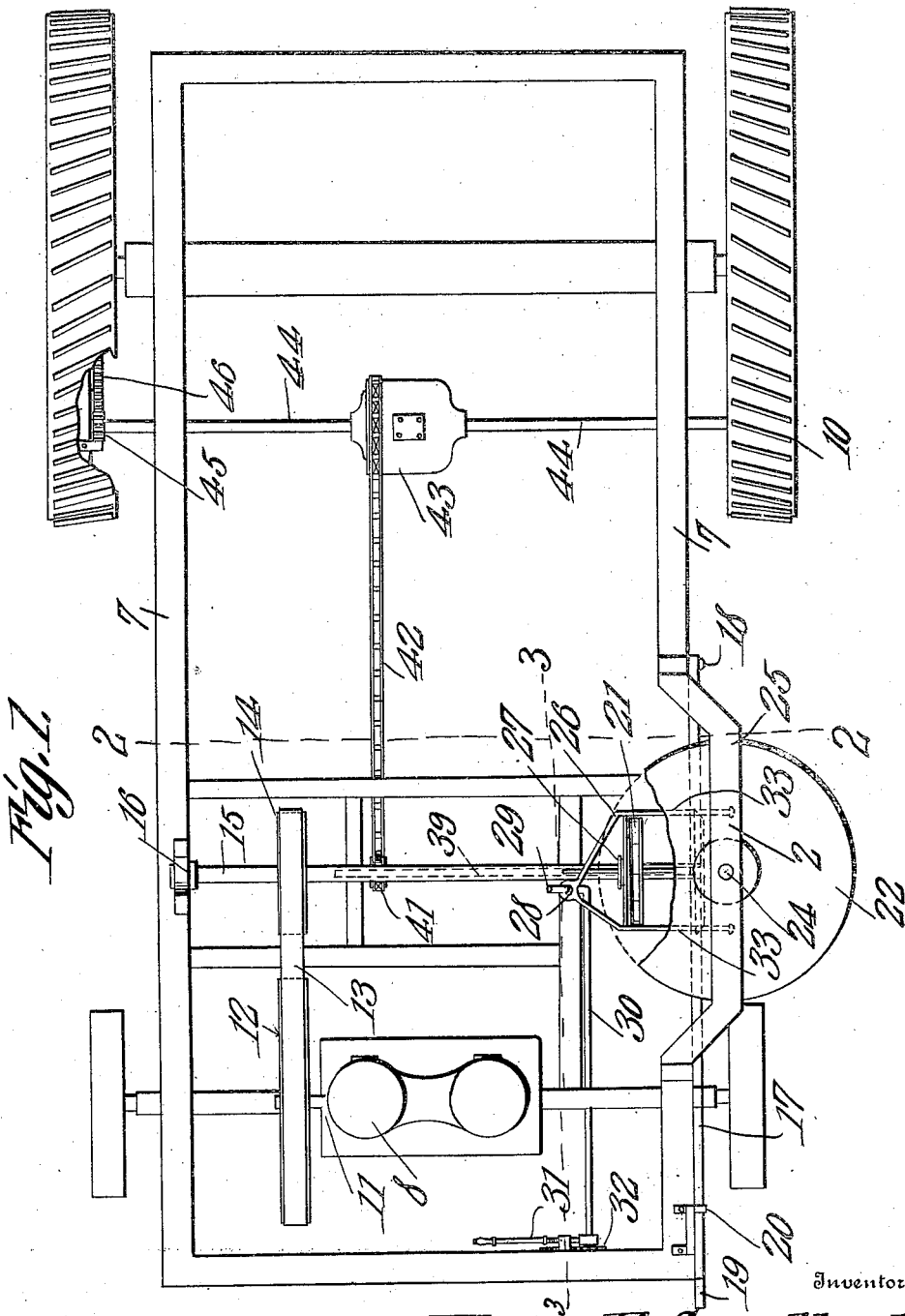

E. E. SWARTHOUT.
GEARING.
APPLICATION FILED FEB. 24, 1909.

940,748.

Patented Nov. 23, 1909.
3 SHEETS—SHEET 2.

Witnesses

Inventor
Elmer E. Swarthout.
By C. A. Snow & Co.
Attorneys

E. E. SWARTHOUT.
GEARING.
APPLICATION FILED FEB. 24, 1909.
940,748.
Patented Nov. 23, 1909.
3 SHEETS—SHEET 3.
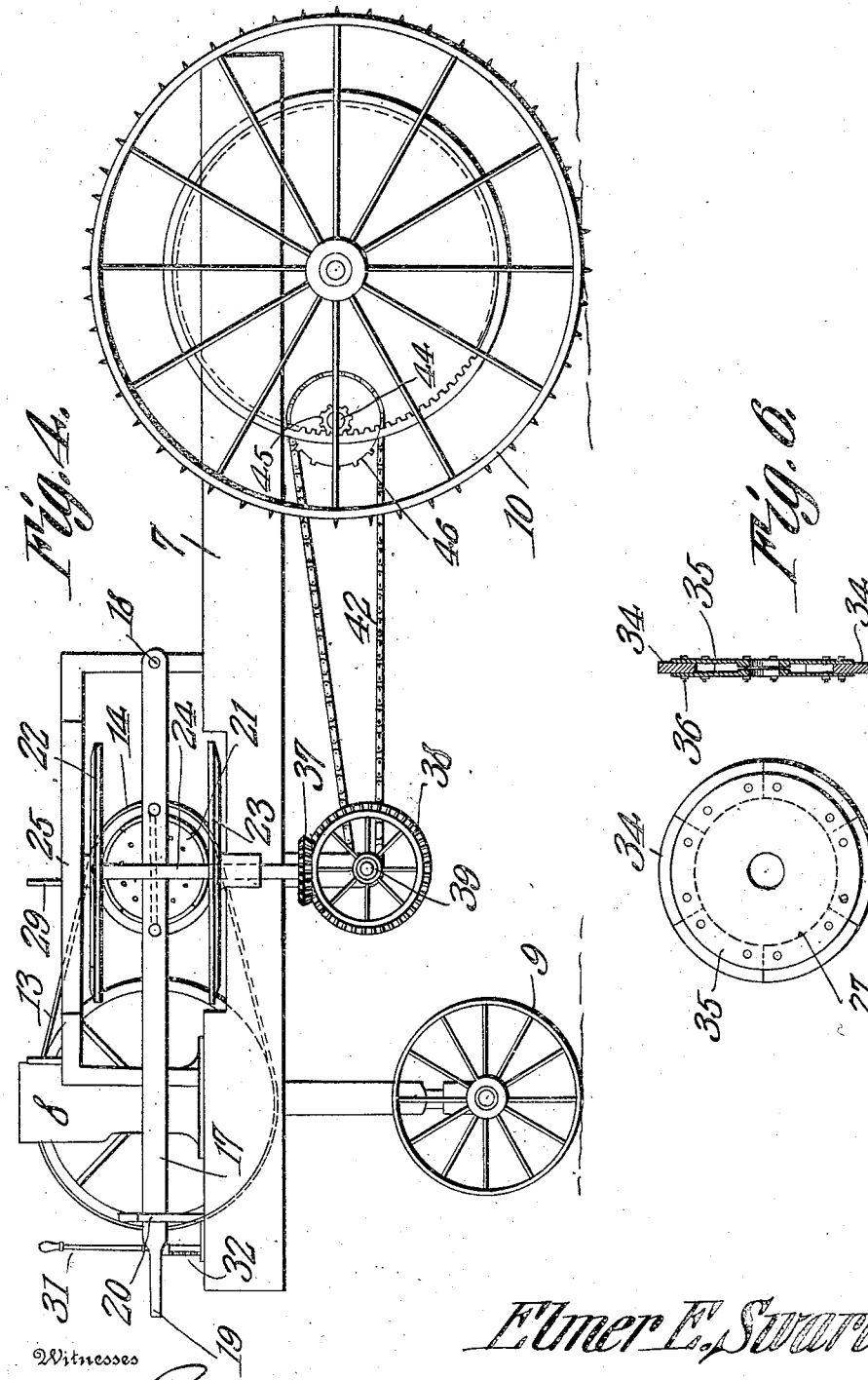

UNITED STATES PATENT OFFICE.

ELMER ELSWORTH SWARTHOUT, OF EVANSTON, ILLINOIS.

GEARING.

940,748.  Specification of Letters Patent.  Patented Nov. 23, 1909.

Application filed February 24, 1909. Serial No. 479,770.

*To all whom it may concern:*

Be it known that I, ELMER E. SWARTHOUT, a citizen of the United States, residing at Evanston, in the county of Cook and State of Illinois, have invented a new and useful Transmission-Gearing, of which the following is a specification.

This invention relates more particularly to that class of transmission mechanism in which a friction gearing is employed, and its object is to provide an improved arrangement of friction disks whereby the power will be more effectually transmitted, and also to provide a reversing and a speed changing mechanism.

The invention also has for its object to provide means whereby the mechanism may be easily controlled, and also to provide a friction disk of novel and improved construction which may be easily repaired when worn.

With the foregoing objects in view, as well as others which will be apparent when the nature of the invention is better understood, the same consists in a construction and combination of parts to be hereinafter described and claimed, reference being had to the drawing hereto annexed forming a part of this specification, in which drawings—

Figure 2:
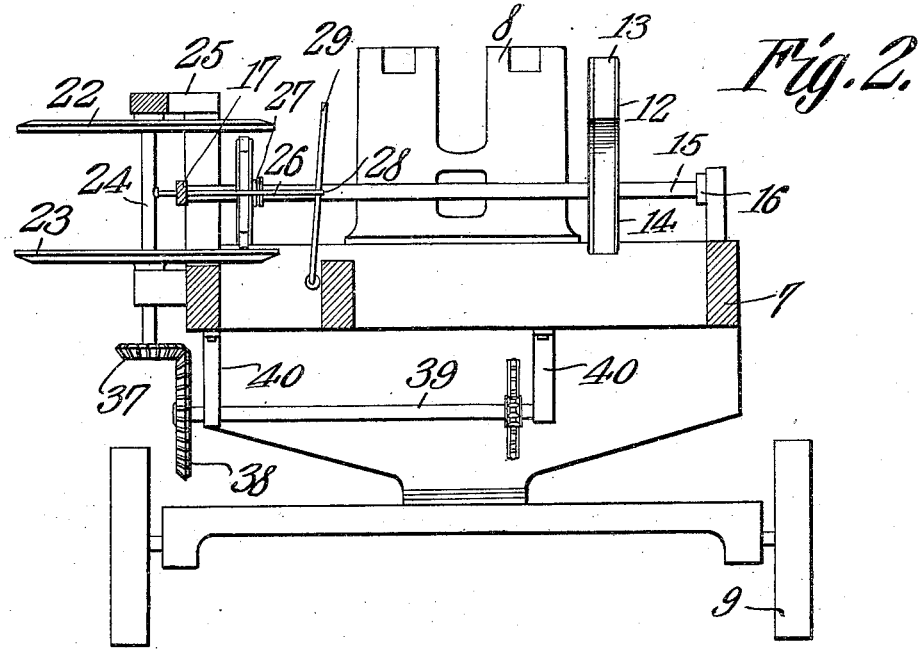
Figure 3:
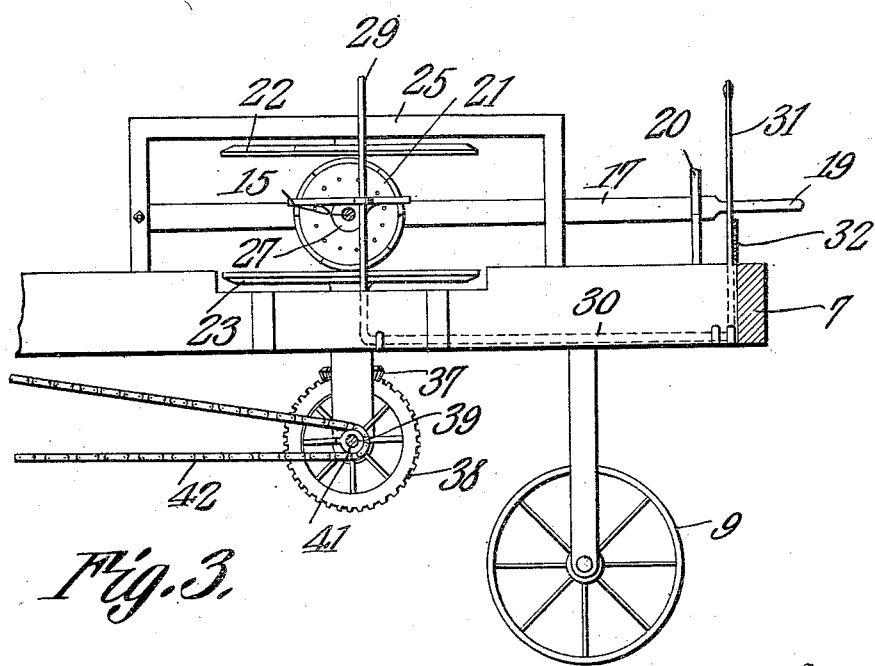

Figure 1 is a plan view showing the application of the invention. Fig. 2 is a transverse section on the line 2—2 of Fig. 1. Fig. 3 is a longitudinal section on the line 3—3 of Fig. 1. Fig. 4 is a side elevation. Fig. 5 is an elevation, and Fig. 6 is a sectional view showing in detail the construction of the friction wheel hereinafter referred to.

In the drawings the invention is shown applied to a traction engine, but I desire it understood that it may be applied to automobiles, or other self-propelled vehicles, as well as to saw mills and other machinery requiring a reversible and speed changing drive.

Referring more particularly to the drawings, 7 denotes a framework which supports the engine, and other parts. The engine is preferably an internal combustion engine, and the same is shown diagrammatically at 8. At 9 are indicated the front or steering wheels and at 10 the hind or traction wheels.

On the crank shaft 11 of the engine is a relatively large pulley 12 which is connected by a belt 13 with a relatively small pulley 14 on a countershaft 15. The last-mentioned shaft is pivotally supported at one end in a bearing 16 in such a manner that it may swing in a vertical plane, for a purpose to be presently described. The other end of said shaft is supported by a lever 17 pivoted at 18 to a suitable support on the frame 7, and provided with a bearing in which the shaft works. The free end of the lever 17 is provided with a handle 19 and is supported by a standard 20 provided with notches which are engageable by a latch carried by the lever, whereby the latter is locked in adjusted position.

The shaft 15 carries a friction wheel 21 which works between friction disks 22 and 23, respectively, mounted on a vertical shaft 24 supported in suitable bearings on a frame 25 mounted on the frame 7.

The friction wheel 21 is splined on the shaft 15 so that it may be shifted lengthwise thereon to change its position with respect to the center of disks 22 and 23, whereby the rate of speed at which the disks are driven is varied. By mounting the shaft 15 so that it may be swung in a vertical plane the friction wheel may be engaged with one or the other of the friction disks, whereby the shaft 24 is reversed.

The shaft 15 is operated to throw the friction wheel from one disk to the other, by means of the lever 17. Upon adjusting the lever so that the friction wheel is out of engagement with both disks, the shaft 24 will be out of gear.

The adjustment of the friction wheel lengthwise on the shaft 15 is accomplished by a yoke 26 which engages the groove of a collar 27 secured to one side of, or formed integral with said wheel. At one end of the yoke is an eye 28 through which passes an arm 29 projecting from a rock-shaft 30 supported by suitable bearings on the frame of the machine, and fitted with a hand lever 31, whereby said shaft is operated. Suitable means are provided for locking the lever at adjustment, said means preferably being a segment rack 32 engageable by a latch carried by the lever. From the yoke 26 also project a pair of arms 33 which extend past the friction wheel and work in transverse openings made in the lever 17. These arms serve to support and guide the yoke. It will be seen that upon rocking the shaft 30 by means of the hand lever 31, the friction wheel 21 will be shifted lengthwise on the shaft 15 whereby its position with respect to the center of the disks 22 and 23 is changed, and the speed at which the shaft 24 is driven is varied. I have described the friction wheel as being splined on the shaft 15, but it will be understood that any other means may be provided for permitting longitudinal movement of said wheel on the shaft.

By providing relatively large and small pulleys 12 and 14, respectively, the friction wheel 21 is driven at a high rate of speed which causes it to cling to the disk with a greater degree of tenacity, and it is less liable to slip. The friction wheel is also quite thin so that the retarding effect due to the difference in the distance between the center of the friction disks and the different portions of the periphery of the wheel, is reduced, that portion of the periphery of the wheel which is nearest to the center of the disks tending to drive said disks at a higher rate of speed than that portion of the periphery most remote from said center.

The friction wheel is composed of sector-shaped blocks 34 of leather, fiber, or other suitable material usually employed in the construction of friction wheels. These blocks are placed together edgewise so as to form a ring, as clearly shown in Fig. 5, and they are clamped together by means of plates 35 placed on opposite sides thereof, said plates being connected by means of bolts 36 which also pass through the blocks, whereby said blocks are securely clamped between the plates. The plates are formed with a hub to receive the shaft 15. The diameter of the disks 35 is less than the outer diameter of the ring formed by the blocks 34, so that the outer periphery of said ring will lie beyond the periphery of the disks in order that the latter may not contact with the disks 22 and 23. By constructing the friction wheel as herein described, the same may be readily repaired, or trued up when worn, it being necessary only to remove the worn block or blocks and replace the same, which can be readily done upon disconnecting the plates 35. The disks 22 and 23 are of steel, and the metal surface thus presented to the periphery of the friction wheel minimizes slipping.

On the lower end of the shaft 24 is a bevel gear 37 which meshes with a similar gear 38 on a shaft 39 mounted in suitable bearings 40 carried by the frame 7. On the shaft 39 is a sprocket wheel 41 which is connected by a chain 42 to a differential which is shown in outline at 43, a further illustration thereof being thought unnecessary as the particular construction of said mechanism is immaterial to the present invention. The differential drives the shaft sections 44 which are geared to the traction wheels 10 by means of pinion 45 on said sections, meshing with internal gears 46 on said wheels. Any other suitable gearing between the shaft sections 44 and the traction wheels may be provided, and if desired, said shaft sections may constitute the axle.

The mechanism herein described is simple, and devoid of complicated parts, and it is therefore reliable in action. The levers 17 and 31 are located in close proximity to each other, and are also so positioned as to be within easy reach of the driver so that the reversal, or a change of speed, can be quickly and easily made. The disks 22 and 23 are of such a size as to permit a wide range of change in the speed.

If desired, a sprocket and chain, or other form of gearing between the shafts 11 and 15 may be employed, and the parts can also be inverted so that the disks 22 and 23 will be vertically disposed instead of horizontally as shown in the drawings.

What is claimed is:

1. In a transmission gearing, a drive shaft pivotally supported at one of its ends, a lever supporting the other end of said shaft, means for holding the lever at adjustment, a friction wheel rotatable with and slidable lengthwise on said shaft, a driven shaft, a pair of friction disks on the driven shaft, between which disks the friction wheel works, a yoke connected to the friction wheel, and having guide arms supported by the aforesaid lever, and means for operating the yoke.

2. In a transmission gearing, a drive shaft pivotally supported at one of its ends, a lever supporting the other end of said shaft, means for holding the lever at adjustment, a friction wheel rotatable with and slidable lengthwise on said shaft, a driven shaft, a pair of friction disks on the driven shaft, between which disks the friction wheel works, a yoke provided with an eye, and connected to the friction wheel, and having guide arms supported by the aforesaid lever, a rock shaft, and an arm projecting from the rock shaft and passing through the eye of the yoke.

In testimony that I claim the foregoing as my own, I have hereto affixed my signature in the presence of two witnesses.

ELMER ELSWORTH SWARTHOUT.

Witnesses:
W. H. BARTLETT,
THOS. F. TORKILSON.